H. TARBOX, 2d.
Cattle Stall.
No. 15,350. Patented July 15, 1856.
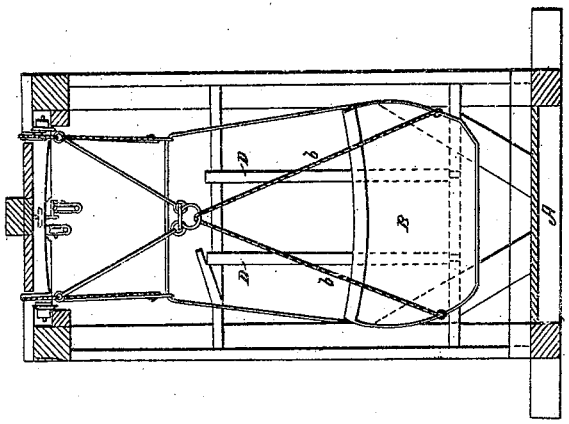
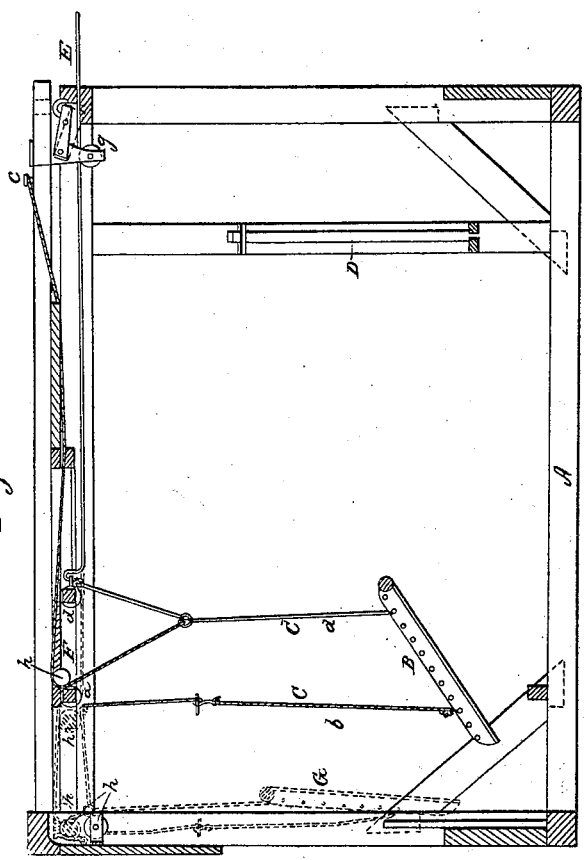
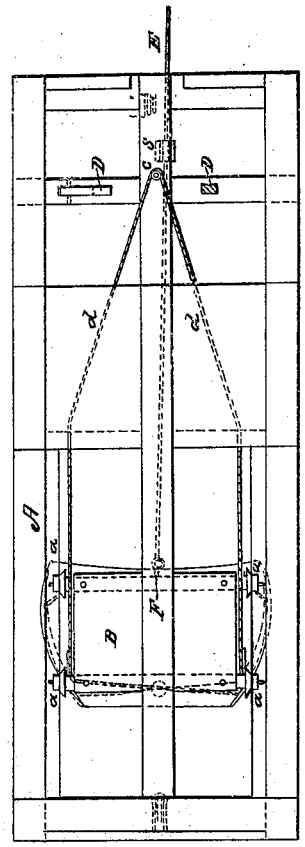

UNITED STATES PATENT OFFICE.

HIRAM TARBOX, 2D, OF TREMONT, NEW YORK.

CATTLE-STALL.

Specification of Letters Patent No. 15,350, dated July 15, 1856.

*To all whom it may concern:*

Be it known that I, HIRAM TARBOX, 2d, of Tremont, in the county of Westchester and State of New York, have invented a new and useful Method of Cleaning the Excrement from Stalled Cattle, &c.; and I do hereby declare that the following is a full and exact description of the same, reference being had to the accompanying drawings, which make a part of this specification.

The nature of my improvement consists in having an excrement apron or its equivalent attached and supported behind the animal.

The following is the description of the improvement.

Figure 1, represents a side view of the frame work A, and apron B, which is supported by cords C, C. Fig. 2, represents an end view of the frame, and a front view of the apron. The upright posts D, D are used to attach horned cattle by seizing them by the neck. Fig. 3, represents a top view of the frame and apron, and cords C, C.

The following is the operation of the improvement: When the animal is standing the apron can be supported at any sufficient height, and bearing against the animal slightly, it will answer the purpose intended; and when the excrement is to be removed the rod E is pressed in, to which is attached a carriage way F on wheels $a$, $a$, $a$, $a$, the cord $b$ which is attached to the lower part of the apron being permanently attached to the pin, $c$, and the pressing of the rod which rests on a friction roller, $g$, shortening the cords, $d$, $d$, which pass over friction rollers, $h$, will cause the apron to be straightened in its position as shown in Fig. 1, at G, when the hand is removed off the rod the apron will again fall to its place. If the apron should want to be kept back the rod can be attached and secured by any simple arrangement which is not necessary to show.

Having thus briefly described my invention, what I desire to secure by Letters Patent is—

In having attached or supported an apron or its equivalent whereby the excrement is prevented from dirting the animal, and also protecting litter or bed, all for the purpose as described and set forth.

HIRAM TARBOX, 2D.

Witnesses:
 EDWIN STREET,
 WM. WEBSTER.